United States Patent [19]

Szepesi et al.

[11] 4,048,285

[45] Sept. 13, 1977

[54] PROCESS FOR THE EXTRACTION OF ALUMINA FROM MINERALS, ROCKS AND INDUSTRIAL BY-PRODUCTS

[75] Inventors: Karoly Szepesi; Lajos Mészáros, both of Budapest; János Majer, Godollo; József Zöldi, Tatabanya, all of Hungary; Karl Entzmann, Vienna, Austria

[73] Assignees: Chemokomplex Vegyipari Gep-es Berendezes Export-Import Vallalat, Budapest; Tatabanyai Szenbanyak, Tatabanya, both of Hungary

[21] Appl. No.: 728,283

[22] Filed: Sept. 30, 1976

Related U.S. Application Data

[63] Continuation of Ser. No. 562,399, March 27, 1975, abandoned.

[30] Foreign Application Priority Data

Apr. 4, 1974 Germany .............................. 2416407

[51] Int. Cl.$^2$ ............................ C01F 7/12; C01F 7/18
[52] U.S. Cl. .................................... 423/132; 423/131; 423/127; 423/111; 423/115; 423/396; 71/58
[58] Field of Search ............... 423/111, 115, 131, 600, 423/127, 132

[56] References Cited

U.S. PATENT DOCUMENTS

| 826,354 | 7/1906 | Peffer | 423/121 |
| 1,856,194 | 5/1932 | Seailles | 423/115 |
| 2,557,891 | 6/1951 | Porter | 423/121 |
| 3,357,792 | 12/1967 | Gehefugi | 423/131 |

FOREIGN PATENT DOCUMENTS

| 545,149 | 5/1942 | United Kingdom | 423/121 |
| 172,087 | 11/1921 | United Kingdom | 423/121 |
| 640,905 | 8/1950 | United Kingdom | 423/115 |

*Primary Examiner*—Herbert T. Carter
*Attorney, Agent, or Firm*—Larson, Taylor and Hinds

[57] ABSTRACT

The invention concerns a process for solubilizing alumina in minerals, rocks or industrial waste products, in which the starting material in finely divided form is mixed with lime in an amount 1 to 3 moles or more of lime (CaO or Ca(OH)$_2$) for each mole of alumina and optionally 1 mole for each mole of any silica present in the starting material, and at the same time or thereafter with water, the resulting mix is maintained under hydrothermal conditions until the alumina has become solubilized by reaction with the lime, and the product is if necessary comminuted to bring it to a form suitable for leaching out of the solubilized alumina.

11 Claims, No Drawings

PROCESS FOR THE EXTRACTION OF ALUMINA FROM MINERALS, ROCKS AND INDUSTRIAL BY-PRODUCTS

This is a continuation of application Ser. No. 562,399, filed Mar. 27, 1975, now abandoned.

The invention provides a process for obtaining metal oxides from minerals, rocks or industrial waste products containing aluminum oxide or hydrated aluminum oxide, in which the raw material is treated with calcium oxide or hydroxide and water, is pasted and is then kept under hydrothermal conditions, that is to say conditions, in which an alumina solubilising reaction of the calcium oxide or hydroxide with the raw material can take place.

The processing of alumina-containing ores and rocks which contain metal oxides other than alumina, and also, generally silica and water of crystallisation, is a very difficult task. The different alumina modifications of varying crystal structure cannot be solubilised with the same ease. It is well known that the hydrargillite in bauxite can be solubilised readily, but that the alumina in minerals having the diaspore or boehmite structure is difficult to dissolve. The best-known process for processing minerals and rocks which contain alumina, generally together with water of crystallisation, is the solubilising of the raw material with caustic soda, the so-called Bayer process. A fundamental factor governing the economics of this industrial-scale process is the consumption of caustic soda; this at the same time defines the processability of such ores.

As the silica content of the ore rises, the "modulus", i.e. the ratio of $Al_2O_3$ to $SiO_2$, diminishes disproportionately. Increasingly large quantities of caustic soda and increasily high pressures and higher temperatures are then required to bring about the solubilisation. The amount of insoluble residue, the so-called red mud, increases, and the environment is polluted by the soluble alkali present in the material going to the waste dump.

As a result, bauxites of high silica content, i.e. with a low modulus, cannot be processed using the Bayer process. Such bauxites are subjected, instead, to a sintering with soda and lime, the so-called "pyrogenic process". This method of dissolution of the raw material is much less economic than the Bayer process and it is therefore in much less widespread use, although — as has been disclosed — its realisation on an industrial scale has come about.

In the technical literature there is described the so-called caustification process, the treatment of the red mud with lime, for the purpose of recovering the caustic soda contained in the red mud. This treatment is the subject also of some patent specifications, for example Hungarian Pat. Nos. 146,434 and 154,125 and Japanese Pat. No. 35-4867. These procedures lay down the use of a relatively large quantity of CaO (33%) for the treatment and have not found widespread use because they are uneconomic. At most 50 - 70% of the NaOH contained in the red mud can be obtained in this way and only in a very dilute concentration, e.g. 5 - 24 g/liter. A further drawback consists in the fact that the alumina cannot be recovered or is recovered only in part, so that the treatment of the red mud residues becomes uneconomic.

Further, there is proposed in German Patent Specification No. 1,280,229 a process for the pre-treatment of bauxite or other raw materials, suitable for producing hydrated aluminum oxide, using an alkaline compound such as, for example, calcium oxide in the presence of water. This pre-treatment consists in intimately pasting together a viscous plastic mixture of the ground raw material, the alkaline compound and water at temperatures between 80° and 150° C using shear forces and then, where applicable, keeping the mixture under hydrothermal conditions. Under these relatively drastic reaction conditions an undesired partial formation of soluble alkali silicates takes place. One result of this drawback is an increased consumption of caustic soda in the subsequent process steps and hence increased costs. Also, a further treatment of the product obtained by the known pre-treatment process with soda is not possible.

Finally, German Published Application No. 2,313,816 proposes a process for reducing the sodium content of the red mud obtained during the Bayer process following filtration and washing by caustification with calcium oxide. In this process the red mud treated with CaO is subjected to a thermal treatment under the action of shear and compressive forces.

It has now been found in accordance with the invention that the alumina content of those rocks or minerals and/or their industrial side products which contain alumina, hydrated alumina and optionally a large amount of admixed silica can be solubilised much more simply and economically with lime using a hydrothermal procedure. This hydrothermal solubilisation procedure comprises homogenising the starting material with from 1 to 3 moles of lime calculated on the number of moles of $Al_2O_3$ that the starting material contains and with preferably an additional 1 mole of lime for each mole of any silica that it contains and with water in the plastic state and then shaping the mixture, followed by repeating this process if necessary in dependence on the conditions which obtain and in this way obtaining possibly a hydraulic setting of this mixture, and solubilisation of the alumina for subsequent dissolving out. During the chemical reactions that take place, i.e. the formation of calcium aluminate and hydrated calcium silicate, a breakdown of the crystal structures occurs and the reactions therefore occupy an appreciable period of time in dependence on the original mineral composition. Consequently, it is necessary to allow the mixture to stand for a correspondingly long period at ordinary temperature — rather like with concrete — or, alternatively, the reaction must be accelerated by supplying heat and by increasing the pressure.

On account of this finding, the hydrothermal solubilising procedure may be carried out in several stages. To begin with, homogenising is carried out leading to the continuous formation of fresh surfaces and bringing the material being processed into intimate contact with lime or hydrated lime. The chemical reagent, namely CaO or $Ca(OH)_2$, is employed together with water, and sufficient time is allowed for loosening the existing structure and allowing new compounds to form.

The major significance of the hydrothermal solubilising procedure of the invention resides in the fact that, by choosing favourable conditions, this difficult task is solved using a very small expenditure of energy by prolonging the time factor or by a thermal treatment at a temperature of 60°-100° C or, in some instances, at up to 180° C. However, in branches of industry which need to work with large capacities and large storage spaces such a task is not unknown. It is well known that the reserves, especially of red mud, held by the alumina-producing industry are sufficient to serve for months or even years.

A further advantage of the process of the invention lies in the ready industrial utilisability of the side product obtained after the hydrothermal digestion and subsequent dissolving out of the alumina.

Furthermore, the process in accordance with the invention displays the advantage that after the hydrothermal solubilising the dissolving out of the individual metallic components can be effected with either acid or alkali, depending on the aimed-for result, or even with water for obtaining caustic soda from the red mud.

Another advantage of the process is that is can be applied to many different alumina-containing waste and side products, for instance red mud or fly ash from power stations. Potassium salts, too, can be obtained from rocks or minerals which contain $K_2O$; even Fuller's earth of excellent quality can be produced from bentonites in this way by a cold method in much more ecomonical manner than hitherto.

In accordance with or during the hydrothermal solubilising carried out according to the invention, the starting material is mixed with an appropriate quantity of lime in the form of CaO or $Ca(OH)_2$ and the required quantity of water, and is then moulded into shape or granulated as applicable. In the system obtained in this way the silica-containing quartzes and alumina components of the siliceous rock or mineral of generally crystalline structure react with the lime and water chemically even at ordinary temperatures in hydrothermal manner and hydrated calcium aluminates and calcium silicates form similarly to hydrated cement materials, while the system undergoes hydraulic setting. The speed of the chemical reactions can be accelerated strongly by increasing the temperature, i.e. by carrying out a steam treatment as during hardening of concrete either at atmospheric or elevated pressure, and in this way the reaction time necessary can be reduced to a few hours. At ordinary temperatures, in dependence on the mineral and chemical composition of the starting materials and hence the formation of the desired structure of the end-product, the reaction time may occupy some days and possibly even some weeks.

In accordance with and during the hydrothermal solubilising treatment calcium aluminate and hydrated calcium silicate systems are formed. These thus contain water of crystallisation, and from them the use of soda ($Na_2CO_3$) or dilute mineral acid enables alumina to be extracted as the primary step, while from the red mud the caustic soda can be washed out by dissolving with water, and the alumina can be removed similarly in the cold with soda solution or dilute mineral acid free from silica and iron. By means of a similar working up, the potassium component can be dissolved out in the cold within a short time from potash felspar or from illite using mineral acid, while from bentonites the metal oxides furnishing Fuller's earths can be dissolved out in adequate amounts. When the starting material contains substantial proportions of silica the residue may be further processed by a fresh addition of lime and a hydrothermal reaction, to lead to additional setting. The residue left after dissolving out the desired components either with acid or alkali can be filtered readily and settles rapidly.

The main stages of the process in accordance with the invention are therefore for example the following:

a determination of the amount of lime required to be added to give 1-3 moles CaO per mole of $Al_2O_3$ present and additionally 1 mole CaO for every mole of any silica present, in dependence on the method of dissolution used (soda solution or acid solution) as described further below;

homogenisation of the raw material with water and the calculated quantity of lime;

granulation or suitable shaping of the water-containing homogenised material;

ripening of the material by storing at ordinary temperature or at a temperature raised to as far as 100° C and atmospheric pressure or, in a closed system, at a steam pressure exceeding the atmospheric pressure at a temperature of not greater than 200° C;

comminution of the hydraulically set system to a particle size of 3000 to 60 microns.

Subsequent steps may be:

dissolution and washing out;

filtration;

working up the mother liquor into metallic compounds;

working up of the filter cake.

As a general rule, the following guidelines serve in the process of the invention. When, except in the case of bentonite, the starting material is a type of clay (kaolinite, illite) or felspar, it is normally necessary to carry out a hydrothermal treatment of several hours at 100-200° C. If the dissolution is carried out with the use of and acid, then the duration of the hydrothermal treatment is shorter and less lime is required to effect the solubilisation than when soda is employed to dissolve out the hydrated alumina. In the case of red mud, bentonites and bauxites of the type of hydrargillite, boehmite and diaspore the hydrothermal solubilisation treatment with lime can proceed as a reaction at ordinary tempertures of a duration of some days or weeks, the compressed briquettes or granules being stored for 5-6 days or for 2-4 weeks at ordinary temperatures; alternatively, however, they can be treated with steam at 80-100° C and atmospheric pressure following their fashioning similarly to the ripening process adopted during manufacture of concrete components. In certain cases, however, it is more appropriate to carry out the heat treatment for some hours at elevated temperature at a steam pressure of 3 - 5 atmospheres, for example where several boehmite and diaspore components are present.

The material submitted to the hydrothermal solubilisation treatment possesses a considerable strength (20 - 100 kfg/cm²) even after one day in the form of both compressed shapes and granules. During the leaching with soda the hardened compressed shapes and granules should preferably be ground to a particle size of less than 100 microns and then boiled with the soda solution for 1-3 hours. Enough soda needs to be added for the NaOH that is formed to be sufficient, i.e. so that all the calcium aluminate can be decomposed quantitatively. If a further treatment with soda is to be given, when diaspore or clay is the starting material, the treatment of the briquettes is preferably carried at elevated temperature or in autoclaves using heat, suitably at 130° - 180° for at least 3-5 hours. In this case a greater quantity of lime, 2-3 moles CaO or $Ca(OH)_2$) per mole of $Al_2O_3$, is required to effect the solubilisation than is the case when acid is used for the dissolution.

For the determination of the amount of lime required it is a general rule that in the case of an acid dissolution the added CaO is that needed to form either monocalcium or dicalcium aluminate from the overall $Al_2O_3$ content of the starting material. For a 50% by weight content of $Al_2O_3$ in the bauxite, for example, it is thus necessary to add between 28% and 56.5% by weight of CaO.

A very important pre-requisite of the process of the invention is an adequate mixing or homogenisation. This presupposes a very thorough admixing of the system consisting of the starting material, the determined quantity of lime and water in such a way that the mixture, if possible, contains no lumps of either free lime or free starting material exceeding 100 microns in size, i.e. the lime is to coat the starting material particles completely. In general, the only suitable appliances which will bring this about are the mixers and mills employed in the ceramic industry for treating colloidal clays. These include brick-moulding presses and similar pug mill units, which can be employed in series-arranged pairs in order to obtain adequate homogenisation and produce the compressed shapes and granules. The opening in the head of the first press is provided with a strong platen perforated with orifices of appropriate diameter. The second extrusion press is connected directly in series and performs the final shaping and granulating. Naturally, the staring material must be comminuted or it must be dispersible in water. The dispersion is carried out in a preliminary mixer, for instance a pan mill, in which the material being processed is blended thoroughly with the required lime and water. If the homogenisation is inadequate the solubilisation achieved is incomplete.

It is appropriate to select nitric acid as the acid for the dissolving stop when using the acid treatment. This selection of nitric acid is significant because, by its use, calcium and ammonium nitrate are formed in amounts equivalent to the nitric acid consumed by the dissolving process in addition to the aluminium hydroxide that is precipitated from the nitric acid solution with ammonia; these nitrate salts represent the familiar artificial nitrogen fertilisers. As is well-established, the quantity of these salts produced in the technically developed countries exceeds by far the quantity of alumina that is produced. Thus, the nitric acid used for dissolving is not lost but is utilised in its entirety in the form of artificial fertiliser salts, which are packed in bags, marketed and used. The process carried out with a hydrothermal lime treatment and with nitric acid or soda solution is, furthermore, very advantageous because it requires a much smaller outlay in terms of vessels and equipment than the Bayer process. It is even possible to increase the capacity of plants now using the Bayer process considerably by adopting this process. The density of the slurry can be raised to 50% instead of the normal value of 15%. Treatment of alkalis in autoclaves, stirring, diluting, settling, and numerous other tedious, time-consuming and expensive operations are eliminated. Finally, the treatment and storage of the red mud, which causes a great deal of trouble, is also eliminated. As a consequence, the setting up of an alumina-producing plant in a factory manufacturing artificial fertiliser, i.e. one not employing the Bayer process, requires substantially lower investment for a given capacity than a Bayer process plant and, in addition, the entire starting material is made use of.

The process of the invention is suitable for use also if acid is not employed for dissolving out the alumina but, instead, dissolving out with soda is used. This procedure is particularly suitable when iron is present in the starting material in a form which partially dissolves in nitric acid. The hydrothermal solubilising treatment here displays the advantage that soda can be used alone for the dissolving instead of the much more expensive sodium hydroxide and, as has been mentioned above, a slurry of much higher concentration is obtained from the solubilised starting material which, moreover, is much more easily filtered and handled that that obtained from the Bayer process. From the alkaline aluminate liquor the $Al(OH)_3$ can be precipitated readily, for instance with carbon dioxide, and the soda solution obtained can be recycled to the dissolving process. Also no sodium hydroxide remains in the red mud and the residual alumina content in the red mud can be reduced considerably. The production of useless and expensive red mud can thus be avoided in straightforward manner in accordance with the invention.

This is effected by the process in accordance with the invention by processing the red mud obtained during alumina manufacture (1.3 tons of red mud for each ton of alumina produced) after the hydrothermal solubilising with lime by completely washing out the $Na_2O$ constituents remaining in the red mud with water, and in a relatively high concentration (e.g. 50 – 100 g/liter).

It is possible to carry out a combined technique to achieve this purpose by allowing the soda, added in an equivalent amount to the lime added, to yield a caustic soda of high concentration on boiling with water. As a result, the red mud with its $Na_2O$ constituents can itself yield caustic soda solution in a concentration of 100 – 150 g/liter, and this will contain a portion of the alumina contained in the red mud in dissolved form. The concentrated alkali obtained in this way is separated from the red mud that is now free of caustic soda, while the remaining alumina can be dissolved with dilute nitric acid even in the cold. The residue from the dissolving process may be smelted without any further treatment or, if desired, following briquetting with lime. Alternatively, however, the highly concentrated alkali produced with the soda is used to bring the alumina left in the red mud into solution as sodium aluminate, as was mentioned earlier. The residue left after whatever dissolving process is used, which contains mainly $Fe_2O_3$ with some $TiO_2$ and silica and, when soda is used for dissolving, also substantial $CaCO_3$, can be hardened with a few percent of burnt or slaked lime by forming hydrated calcium silicate in hydraulic manner, and in this form can be smelted straightforwardly. To dissolve out the $Na_2O$ component from the red mud, the lime is employed in an amount during the hydrothermal processing which corresponds to the formation of tricalcium aluminate from the alumina instead of the earlier mentioned monocalcium aluminate.

As has already been stated, certain rocks and minerals rich in potassium are solubilised in such a way by the hydrothermal treatment that the potassium constituents can be washed out simply by dissolving in nitric acid. Normally, this takes place together with the dissolving out of the alumina. How much lime is required for the hydrothermal treatment, and the nature of the carrying out of the hydrothermal treatment, needs to be established in accordance with the nature of the starting material. The decisive criterion in this procedure for both metal oxides in the crystalline or glassy structure of the starting material. Thus, for example, potash felspars and potash trachytes need to be treated with a quantity of lime corresponding to the dialuminate composition; under these circumstances the $K_2O$ is rendered soluble together with the $Al_2O_3$ after a treatment of 6–8 hours in an autoclave at 8 atmospheres even at room temperature or by boiling in nitric acid. With rocks containing tuff-like potassium oxide, i.e. glassy potassia, of amorphous structure, a smaller amount of lime than that corresponding to the dicalcium aluminate composition is usually adequate for the hydrothermal solubilising treatment; the treatment is then carried out as a prolonged reaction or as one using steam at atmospheric pressure for 8 hours.

It has been found that the montmorillonite component of bentonites is not always present in an amount that is the optimum one for the production of Fuller's earth. This is because the crystal lattice of montmorillonite is known to be strongly expanded or drawn out by water under suitable conditions relative to the generally contracted state of the lattice. The montmorillonite can expand or contract in accordion-like fashion. In natural deposits the crystal lattice of the moist bentonites as mined is present in the contracted or at most moderately expanded state. On treatment with acid and on boiling the lattice remains in its initial state, i.e. is neither expanded nor contracted. Clearly, montmorillonite in its fully expanded state, firstly, has a much larger surface area than in its average or contracted state and, secondly, the basic oxides which it contains can be dissolved out more rapidly and more completely with mineral acids under otherwise identical conditions.

In the process of the invention the montmorillonite lattice is expanded to the maximum extent before the acid treatment. The montmorillonite is given a substantially greater surface area than in its natural state and the dissolving of the basic oxides is accelerated substantially. Moreover, the starting material yields a Fuller's earth of much greater active surface area and hence of much greater clarifying power.

This expansion of the lattice is achieved by means of an intense kneading together of the montmorillonite with lime and water.

The rapid dissolution of the basic constituents of the montmorillenite lattice and the strong loosening of these constituents in the lattice itself is achieved in accordance with the invention in hydrothermal fashion by virtue of the formation of hydrated calcium polyaluminates. From bentonites and other suitable siliceous materials such as illites and volcanic tuffs, but primarily from the bentonites, brought into this state, it is possible to obtain Fuller's earths of excellent quality. The boiling in mineral acids is shortened to only 10 – 60 minutes instead of the mentioned 7 –10 hours, while in dependence on the starting material dissolving at ordinary temperatures during 20 –60 minutes may be successful.

Self-evidently the economics of this process can be enhanced further by employing an acid forming artifical fertilisers, for example nitric acid, for the dissolving instead of the usual sulphuric acid or hydrochloric acid.

A number of embodiments of the process of the invention will now be described by way of the following examples.

EXAMPLE 1

The starting material is a bauxite of the following mineralogical and chemical composition. Minerals: 50.14% hydrargillite (gibbsite); 15.64% boehmite; 10.00% kaolinite; 21.09% haematite, goethite, etc.; 3.13% other components. Modulus = 10.75. Oxide composition: 50.04% $Al_2O_3$ (of which 3.95% is combined with kaolinate); 4.65% $SiO_2$; 19.0% $Fe_2O_3$; 2.52% $TiO_2$ 21.09% $H_2O$ (loss on ignition); 2.70% other substances. The bauxite has a soft clayey consistency and is readily dispersed.

No lime is allowed for the $SiO_2$ and $Al_2O_3$ in the kaolinite, but only for the rest of the bound $Al_2O_3$ (47%). The quantity of lime is calculated in terms of 50% monocalcium aluminate and 50% dicalcium aluminate giving a total of 390 kg calcium oxide. The corresponding amount of hydrated lime is mixed coarsely with water (about 25%) and 1000 kg bauxite in a pan mill and the composition obtained is then passed through a brick press for homogenisation, the opening in the head of the press being provided with a perforated plate having holes of 25 mm diameter. The granulated product is passed through a second series-connected brick press and shaped into briquettes of normal size.

These briquettes are stored in a depository and kept there for one month at normal temperature. During this period the solubilising of the bauxite constituents takes place. Subsequently, the hydraulically hardened material is ground to a particle size below 100 microns and is boiled for 2 hours at atmospheric pressure with an amount of soda solution (369 b/liter) equivalent to the calcium oxide added, a 1:2 ratio of bauxite to soda solution being maintained. Following boiling the $Al(OH)_3$ is obtained by a procedure which is in every way the same as in the Bayer process. The amount of hydrated alumina obtained in this way is 80% of the quantity originally present. Following pelletisation, the residue can be used for smelting operations.

EXAMPLE 2

The same procedure as in Example 1 is used, but with the difference that after the solubilising on storage for 1 month the coarsely ground product is dissolved in 10% nitric acid with constant stirring until the solution has a pH of 2. Following filtration of the solution, the hydrated alumina is precipitated with ammonia and the calcium and ammonium nitrate which remain in solution are worked up into artifical fertiliser by evaporation in the usual way. The residue from the acid dissolution, which contains $Fe_2O_3$, $TiO_2$, a little silica, and a major proportion of undecomposed kaolinite, is homogenised and granulated using 3% by weight CaO. After a few days the material obtained in this eay hardens and is then suitable for smelting.

EXAMPLE 3 The starting mterial is a carbonate-containing bauxite from Halimba, Hungary having the following mineralogical and chemical composition. Mineralogical composition $Al_2O_3$ content of the kaolinite = 38%. Chemical composition: loss on ignition = 15.9%; $Al_2O_3$ = 45.6%; $Fe_2O_3$ = 20.3%; $SiO_2$ = 8.1%; $TiO_2$ = 2.0%; CaO = 3.9%; MgO = 2.0%. Modulus = 5.6.

To 1 tonne of the coarsely pre-comminuted bauxite, calculated on the dry weight, 620 kg quicklime (CaO) are added to give a 2.5 : 1 molar ratio of CaO to $Al_2O_3$ and the mixture is ground in a ball mill to a particle size of less than 300 microns. The product is then wetted with water in the mixing trough of a brick moulding press to a soft-plastic consistency, and the composition is then forced through the perforated-plate press described in Example 1 to form granulated material. This granulated material is treated with steam for 3 hours at a pressure of 5 atmospheres. The solubilised system is ground to a particle size below 100 microns and the ground material, containing 1170 kg soda, is boiled in 4 cubic meters of water for 2 hours. The solution obtained contains 90% of the original alumina present, and the aluminium can be preciptated as hydroxide in known manner by passing in carbon dioxide. After filtration the solution contains 292 g/liter $Na_2CO_3$ and it is recycled to further processing.

EXAMPLE 4

The starting material is red mud from Almasfuzito, Hungary having the following chemical composition: loss on ignition = 9.50%; $SiO_2$ = 13.20%; $Al_2O_3$ = 18.04%; $Fe_2O_3$ = 39.60%; CaO = 1.33%; $TiO_2$ = 4.37%; $Na_2O$ = 9.70%; $Na_2CO_3$ = 2.18%; remainder = 2.08%.

The calculated overall NaOH content of the red mud is 14.40 percent per tonne. This red mud contains 36% moisture, i.e. 1560 kg raw material are taken to give 1000 kg dry material. This amount contains 132 kg combined silica, 180 kg alumina and 144 kg NaOH. Basing the CaO required for the hydrothermal solubilsation on tricalcium aluminate for the alumina present and on monocalcium silicate for the silica present, it is necessary to add 297 + 123 = 420 kg CaO to 1560 kg red mud. 90% of the CaO is consumed. Thus, a total of 462 kg ground material together with 210 liters water are added. The red mud is pre-mixed and pre-homogenised with the calculated amount of CaO and water in a Eirich type pan mill. The fine homogenising and shaping is carried out as in Example 1 for bauxite. Subsequently, the compressed shapes having the size of normal bricks are stored in the open air underneath a protective roof for 5 days. During this period a strong hydraulic hardening of the shapes takes place. The mixture consists of the following components by weight: 1560 kg red mud of natural moisture content, 462 kg CaO, 210 kg water, total 2232 kg. During storage about 10% of the water is lost, so that the eventual weight of the mixture is 2000 kg, of which 144 kg is the NaOH content representing 7.2%, and 180 kg is the $Al_2O_3$ content representing 9%.

The red mud solubilised and hardened with lime hydrothermally is then ground to a particular fineness of less than 100 microns and boiled with 1800 liters water for 1 hour at atmospheric pressure. The readily filtered slurry is then filtered on a vacuum filter to yield a filtrate containing 140 kg NaOH in 1900 liters water, i.e. 73.6 g/liter NaOH in addition to a 50% content of Al(OH)$_3$. This alkaline liquor is returned to the material being processed in a Bayer process plant for further use. From the material left on the filter press the residual portion of Al(OH)$_3$ is obtained by acid processing in accordance with the method described in Example 2 for processing bauxite. After dissolving with acid the residue formed, which consists largely of $Fe_2O_3$, $SiO_2$ and $TiO_2$, is made into a paste and shaped with an amount of CaO corresponding to monocalcium silicate in terms of the $SiO_2$ content, so that the compressed shapes harden after only 1 day's storage and can then be transported and processed by smelting.

EXAMPLE 5

The same procedure is used as in Example 4, except that the solubilised and hardened product obtained by a prolonged reaction with lime is ground and is then dispersed in an equal amount of water, while the liberated NaOH dissolves and is washed out. Subsequently 4 cubic meters of water and enough soda are added to 2 tonnes of the material to enable the soda to decompose half the alumina that is combined with the lime, i.e. 289 kg soda, equivalent to 150 kg of the lime, are introduced into the system. 214 kg NaOH are formed. Accordingly, a total of 358 kg NaOH, made up of the 214 kg and the 144 kg in the red mud, are contained in the system, and these are associated with 90 kg $Al_2O_3$. In this way 50% $Al_2O_3$ can be dissolved and obtained from the red mud without any substantial soda losses.

EXAMPLE 6

The procedure of Example 4 is used, with the difference that following leaching of the solubilised red mud with water, i.e. dissolving of the NaOH, filtration is carried out. Subsequently, the CaO and the $Al_2O_3$ components are dissolved and washed out from the alkali-free residue obtained with nitric acid in the same way as was described for the acie processing of the bauxite. cl

EXAMPLE 7

The starting material is fly ash from the waste dump in Tatabanya (Banhida), Hungary, having the following chemical composition: $SiO_2$ = 43.82%; $Al_2O_3$ = 30.04%; $Fe_2O_3$ =7.60%; CaO = 5.52%; MgO = 0.32%; $Na_2O$ = 1.24%; $K_2O$ = 1.24%; $SO_3$ = 1.37%; loss on ignition = 9.24%.

The CaO required for the hydrothermal solubilisation of the $Al_2O_3$ is calculated as dicalcium aluminate, making allowance for the 5.52% contained in the material. Accordingly, 300 kg CaO or the equivalent amount of Ca(OH)$_2$ are added for each tonne of dry fly ash. The fly ash is homogenised and shaped with this quantity of lime as described in Example 1 and the moulded bricks are then treated with steam for 6 hours at a temperature of 80 -100° C. The hardened compressed shapes are ground to a particle size of less than 1 mm, the product is dissolved for 1 hour in nitric acid, using an excess of acid which results in a pH of at most 2; 10% nitric acid is employed. Following filtration the Al(OH)$_3$ is precipitated in known manner with ammonia and the salts, consisting of nitrates, that remain in the solution are utilised as artifical fertiliser. 95% of the $Al_2O_3$ content of the fly ash can be obtained as iron-free alumina. The residue can be used as a filter material, having a good absorption capacity, for effluent purification or, admixed with 20% CaO, as expanded concrete building blocks, in accordance with Hungarian Patent Application No. 2251/SE/1564/1971 (SE-1564).

EXAMPLE 8

The starting material is one tonne of ground pot-ash trachyte from Kanyahegy (Telkibanya), Hungary, with a particle size of less than 100 microns and the following composition: $SiO_2$ = 60.93%; $Al_2O_3$ =]14.65%; $Fe_2O_3$ = 3.24%; CaO = 4.00%; $K_2O$ = 10.60%; $Na_2O$ = 0.43%; remainder = 6.15%.

Homogenisation is carried out in the brick press with the lime required to give 3 moles for each mole of $Al_2O_3$ present, i.e. with 250 kg lime and the necessary amount of water and the product is compressed to form briquettes which are then processed for 6 hours in an autoclave under 8 atmospheres pressure. Following comminution of the hardened semi-finished product, dissolution with nitric acid is performed as in the preceding examples. The filtrate in addition to calcium, aluminum, iron and sodium nitrate contains the potassium salt as potassium nitrate. These substances are marketed together as a mixed artificial fertiliser salt. The mixed artificial fertiliser salt may be admixed with the silica constituents remaining on the filter serving as carrier substance. Alternatively, however, the aluminum hydroxide can be obtained from the original filtrate with ammonia in familiar manner, as has already been mentioned in the earlier examples, and especially if little iron impurity is present.

EXAMPLE 9

The starting material is calcium bentonite from Istenmezeje, Hungary with a calcium montmorillonite content of 80%, which contains 18% $Al_2O_3$, 4.0% $Fe_2O_3$ and 3.0% MgO in addition to 63.0% $SiO_2$. 10 percent by weight CaO is required to form the aluminium nitrate, i.e. 1 mole of CaO for each more of $Al_2O_3$. The predried bentonite is crushed to a particle size of less than 5 mm in a toothed roller mill, and is introduced into a brickworks pan mill with 10% CaO or the equivalent amount of hydrated lime; wetted to the necessary amount; milled; subsequently wetted further according to need in the pan mixer and finally charged into a brick press with a perorated orifice plate for additional homogenisation and granulation. The semi-finished product obtained is stored for 10 days in the open air at ambient temperature, and is then ground down to a particle size of some tenths of a millimeter, stirred with water to form a dense, still pumpable slurry and pumped into an appropriate vessel. Here it is admixed with nitric acid to effect 60 –70% dissolution of the basic constituents ($Al_2O_3$, $Fe_2O_3$, MgO) of the bentonite using an amount of acid such that the residual nitric acid advantageously reaches the concentration of normal nitric acid. Boiling is carried out for 30 minutes and the slurry is then filtered and washed almost free from acid to a pH of 4–5 and is then dried. Further grinding is generally unnecessary because the product is obtained in a lightly dusting, broken down state. The filtrate, which contains all dissolved substances in the form of nitrates in addition to a small excess of nitric acid, is neutralised with ammonia and can be worked up into artifical fertiliser by evaporation of the water. In order to raise the concentration of the artificial fertiliser salts in the filtrate, such a salt solution filtrate can be used for making up further batches of nitric acid for use with the bentonite.

We claim as our invention:

1. A process for recovering alumina present in an alumina-bearing material selected from the group consisting of minerals, rocks, and industrial waste products derived from such minerals or rocks comprising the steps of:
    a. kneading particles of said alumina-bearing materials with lime and water to form a homogeneous plastic mass, said lime being present in an amount of 1 to 3 moles per mole of alumina in said alumina-bearing material;
    b. forming said homogeneous plastic mass into a plurality of shaped bodies;
    c. maintaining said shaped bodies under hydrothermal conditions at a temperature of up to 200° C for a time sufficient for the bodies to harden by hydraulic setting and to solubilize the alumina in the bodies by reaction with said lime;
    d. comminuting the hardened bodies; and
    e. leaching the solubilized alumina from the comminuted hardened bodies.

2. A process according to claim 1 wherein said alumina-bearing material additionally bears silica and wherein additional lime is present in an amount of about 1 mole per mole of silica in said alumina-bearing material.

3. A process according to claim 2 wherein said shaped bodies are maintained under said hydrothermal conditions at a pressure above atmospheric.

4. A process according to claim 2 wherein said shaped bodies are maintained under said hydrothermal conditions at atmospheric pressure.

5. A process according to claim 1 wherein said comminuted hardened bodies have a particle size of from 60 to 3000 microns.

6. A process according to claim 1 wherein said alumina-bearing material comprises red mud and wherein solibilized alumina is leached from said comminuted hardened bodies with boiling water.

7. A process according to claim 1 wherein the amount of said lime is from 2 to 3 moles per mole of alumina in said alumina-bearing material and wherein said alumina is leached from said comminuted hardened bodies with a solution comprising sodium carbonate.

8. A process according to claim 1 wherein the amount of said lime is from 1 to 2 moles per mole of alumina in said alumina-bearing material and wherein said alumina is leached from said comminuted hardened bodies with a solution comprising a mineral acid.

9. A process according to claim 8 wherein said acid comprises nitric acid.

10. A process according to claim 9 wherein, after leaching with nitric acid, ammonia is added to the leaching solution to form an alumina precipitate and an ammonium nitrate solution.

11. A process according to claim 1 wherein said alumina-bearing material is selected from the group consisting of bauxite, clay, red mud, bentonite, volcanic tuff, and fly ash.

* * * * *